United States Patent
Ding (10) Patent No.: US 12,244,139 B2
(45) Date of Patent: *Mar. 4, 2025

(54) OVERVOLTAGE PROTECTION FOR DATA COMMUNICATION PATH

(71) Applicant: Google LLC, Mountain View, CA (US)

(72) Inventor: Yao Ding, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,488

(22) Filed: Feb. 15, 2024

(65) Prior Publication Data

US 2024/0186788 A1    Jun. 6, 2024

Related U.S. Application Data (63) Continuation of application No. 17/852,870, filed on Jun. 29, 2022, now Pat. No. 11,936,180.

(51) Int. Cl.
*H02H 9/04* (2006.01)

(52) U.S. Cl.
CPC .................... *H02H 9/046* (2013.01)

(58) Field of Classification Search
CPC ........................................ H02H 9/046
USPC ........................................ 361/91.1
See application file for complete search history.

(56) References Cited

U.S. PATENT DOCUMENTS

| | | | |
|---|---|---|---|
| 8,796,997 B2 * | 8/2014 | Cassidy | B60L 58/15 |
| | | | 320/152 |
| 9,122,288 B1 * | 9/2015 | Nayak | G06F 1/266 |
| 11,710,946 B2 * | 7/2023 | Hoffmann | H02H 9/06 |
| | | | 361/112 |
| 11,936,180 B2 | 3/2024 | Ding et al. | |

(Continued)

FOREIGN PATENT DOCUMENTS

| | | | | |
|---|---|---|---|---|
| CA | 2225362 | | 8/2001 | |
| CA | 2225362 C | * | 8/2001 | .............. H04M 3/18 |

(Continued)

OTHER PUBLICATIONS

"Notice of Allowance", U.S. Appl. No. 17/852,870, filed Nov. 9, 2023, 8 pages.

(Continued)

*Primary Examiner* — Dharti H Patel
(74) *Attorney, Agent, or Firm* — Colby Nipper PLLC (57) ABSTRACT

A circuit for controlling an interface between an integrated circuit of an electronic device and an external device includes each of an interface control switch and an overvoltage protection switch. The interface control switch includes a controller for controlling a mode of the interface between a data communication mode that connects the external device to the integrated circuit of the electronic device via one or more communication lines of the electronic device, and a power transmission mode that connects a power source of the external device to a battery of the electronic device. The controller includes a reset line for (Continued)

resetting the interface control switch. The overvoltage protection switch is connected between the one or more communication ports and the reset line, and is configured to activate the reset line of the controller in response to an overvoltage condition at the one or more communication lines of the electronic device.

20 Claims, 7 Drawing Sheets

(56) References Cited

U.S. PATENT DOCUMENTS

| | | | |
|---|---|---|---|
| 2010/0165528 A1* | 7/2010 | Chan | H04L 12/40045 |
| | | | 361/86 |
| 2015/0318683 A1* | 11/2015 | Voelger | H02H 3/20 |
| | | | 361/91.1 |
| 2016/0025790 A1* | 1/2016 | Forst | H02H 3/24 |
| | | | 324/538 |
| 2016/0190794 A1* | 6/2016 | Forghani-Zadeh | H02H 9/045 |
| | | | 361/86 |
| 2021/0091598 A1 | 3/2021 | Ng et al. | |
| 2021/0218595 A1 | 7/2021 | Liu et al. | |
| 2024/0006879 A1 | 1/2024 | Ding | |

FOREIGN PATENT DOCUMENTS

| | | | | |
|---|---|---|---|---|
| CA | 2517333 | | 11/2007 | |
| CA | 2517333 C | * | 11/2007 | ............ H02J 7/0027 |
| CA | 2536301 | | 5/2009 | |
| CA | 2536301 C | * | 5/2009 | ............. G06F 1/266 |
| CA | 2550404 | | 9/2009 | |
| CA | 2550404 C | * | 9/2009 | ............. G06F 1/263 |
| WO | 2019192212 | | 10/2019 | |
| WO | WO-2019192212 A1 | * | 10/2019 | ......... H02J 7/00034 |
| WO | 2021200195 | | 10/2021 | |
| WO | WO-2021200195 A1 | * | 10/2021 | ............. B60L 50/60 |
| WO | 2022005449 | | 1/2022 | |
| WO | WO-2022005449 A1 | * | 1/2022 | ............... H04B 3/54 |

OTHER PUBLICATIONS

Wallace, et al., "High-Efficiency Charging for TWS Using a 2-Pin Interface", Jun. 2020, 32 pages.

* cited by examiner

OVERVOLTAGE PROTECTION FOR DATA COMMUNICATION PATH

RELATED APPLICATION(S)

This application is a continuation of and claims priority to U.S. patent application Ser. No. 17/852,870, filed on Jun. 29, 2022, the disclosure of which is incorporated by reference herein in its entirety.

BACKGROUND

An electronic device may include capabilities for both power transmission and data communication. For instance, the electronic device may include a main integrated circuit (IC) having a communication port for bidirectional data communication with other electronic devices, and a power port for receiving power from the other electronic devices.

The electronic device may also include an external port for interfacing with the other electronic devices. In an effort to reduce the total number of components, lower the cost of production, and improve cosmetic design of the electronic device, the external port may be designed with a single physical connection that interfaces with both the power port and communication port of the main IC, thereby supporting both power transmission and data communication capabilities. The single physical connection may include a switching regulator or other type of switch having a controller to transition between a power transmission mode and a data communication mode.

However, designing the interface with a single physical connection introduces a risk of damage to the electronic device. If the switch transitions from the power transmission mode to the data communication mode before the other electronic device stops transmitting power, even for a short amount of time, then a high voltage may inadvertently be received at the communication port of the electronic device. While the high voltage may be within a tolerance of the power port of the main IC, but it may be in excess of a maximum tolerance at the communication port and may cause damage to the IC.

One possible way to protect the communication port from high voltage in the event of a switch failure is to manufacture the IC with a port protection functionality. This requires either initially manufacturing the IC with the port protection functionality or adding the functionality to the IC at a later time. Adding port protection functionality requires an update to the chip, which can take a full year or more to design, test and ultimately implement. Other known port protection solutions, such as adding a buffer IC between the switch and the main IC, can be implemented faster but may add considerable size and cost to the design of the device—in terms of both parts and labor—and may result in power loss issues.

BRIEF SUMMARY

The present disclosure provides a power clamping solution for protecting the communication port of an electronic device IC from overvoltage in the event of the switch failure. The power clamping solution takes advantage of a reset feature of the switch controller, whereby triggering a reset of the switch controller causes the pin connections for the data communication mode to fully open, thereby disconnecting the communication port from the external port of the electronic device interface.

One aspect of the disclosure is directed to a circuit for controlling an interface between an integrated circuit of an electronic device and an external device, the circuit including: (a) an interface control switch including a controller for controlling a mode of the interface between each of: a first mode for data communication that connects the external device to the integrated circuit of the electronic device via one or more communication lines of the electronic device; and a second mode for power transmission that connects a power source of the external device to a battery of the electronic device, wherein the controller includes a reset line for resetting the interface control switch; and (b) an overvoltage protection switch connected between the one or more communication lines of the electronic device and the reset line of the controller, and configured to activate the reset line of the controller in response to an overvoltage condition at the one or more communication lines of the electronic device.

In some examples, the one or more communication lines of the electronic device may be configured to support receiving up to a first voltage level, and wherein the second mode is configured to deliver a voltage to the battery of the electronic device at a second voltage level greater than the first voltage level.

In some examples, the second voltage level may be less than twice the first voltage level.

In some examples, the first voltage level may be about 2.5 volts, and the second voltage level may be about 3.7 volts.

In some examples, the first mode may be a universal asynchronous receiver-transmitter (UART) mode, and the second mode may be a power line communication (PLC) mode.

In some examples, the UART mode may be configured to support data communication over the interface at a first throughput, and the PLC may be configured to support data communication over the interface at a second throughput lower than the first throughput.

In some examples, the first throughput may be 4 Mbps, and the second throughput may be 100 Kbps or lower.

In some examples, the overvoltage protection switch may include a transistor having a drain connected to the reset line and a gate-source path and resistor divider positioned between the one or more communication lines of the electronic device and ground, and the gate may be configured to activate the reset line in response to the voltage across the gate-source path reaching a gate threshold.

In some examples, the overvoltage condition may be a voltage greater than or equal to a predetermined threshold voltage, the gate threshold may be less than the predetermined threshold voltage, and the overvoltage protection switch may further include a voltage divider arranged to provide a voltage at the gate threshold across the gate-source path when the voltage at the one or more communication lines of the electronic device is equal to the predetermined threshold.

In some examples, the predetermined threshold may be about 2.5 volts, and the gate threshold may be about 0.7 volts.

In some examples, a footprint of the overvoltage protection switch may be between 0.4 mm$^2$ and 1 mm$^2$.

In some examples, the reset line for resetting the interface control switch may be configured to, when activated, set the integrated circuit of the electronic device to a high impedance mode.

In some examples, the interface control switch may be configured to, when the reset line is activated, set the integrated circuit to the high impedance mode in less than one microsecond.

In some examples, the interface between the electronic device and the external device may be a single physical connection configured to support both the first mode and the second mode.

In some examples, the interface control switch may be an integrated switching regulator.

In some examples, the battery of the electronic device may be rechargeable, and the external device may be a charger.

In some examples, the electronic device may be a smartphone, smartwatch, headphone, or earbud, and the integrated circuit may be integrated into a housing of the electronic device.

Another aspect of the disclosure is directed to a method for controlling an interface between an integrated circuit of an electronic device and an external device, the method including controlling, by an interface control switch, a mode of the interface between each of a first mode for data communication that connects the external device to the integrated circuit of the electronic device via one or more communication lines of the electronic device and a second mode for power transmission that connects a power source of the external device to a battery of the electronic device, receiving, by the interface control switch, a reset signal from a reset line connecting the interface control switch to an overvoltage protection switch connected between the one or more communication lines of the electronic device and the reset line of the controller, and activating, by the interface control switch, a high impedance mode at the integrated circuit of the electronic device in response to the reset signal, wherein the high impedance mode avoids power from the external line reaching the integrated circuit via the one or more communication lines of the electronic device.

In some examples, the overvoltage protection switch may include a transistor having a drain connected to the reset line and a gate-source path and resistor divider positioned between the one or more communication lines of the electronic device and ground, and the reset signal may be received in response to the voltage across the gate-source path reaching a gate threshold.

In some examples, the first mode may be a universal asynchronous receiver-transmitter (UART) mode configured to support data communication over the interface at a first throughput, the second mode may be a power line communication (PLC) mode configured to support data communication over the interface at a second throughput lower than the first throughput, and controlling the mode of the interface may include switching between the UART mode and the PLC mode.

DETAILED DESCRIPTION

Overview

The present disclosure provides a power clamping solution for protecting the communication port of an electronic device IC from overvoltage using a reset function of a switch controller to disconnect the communication port of the electronic device.

The reset may be triggered by the detection of an overvoltage event at the communication port. For example, a wired connection between the communication port and the reset port of the switch controller may be added to the electronic device. The wired connection may include an overvoltage protection switch that turns on in response to the overvoltage event. The overvoltage protection switch may include a transistor having a drain connected to the reset port and a gate-source path positioned between the communication port and ground. When voltage at the communication port reaches a threshold amount, the gate-source voltage may be large enough to turn on the gate of the overvoltage protection and activate the reset mode of the switch controller of the electronic device.

In an example embodiment of the disclosure, the electronic device may be a rechargeable electronic device such as a smartphone, smartwatch, earbud, and so on, and the external device may be a charger or charging case for the electronic device. Each of the electronic device and the external device may include an integrated switching regulator for controlling a mode of a single physical connection between the two devices. For example, a first mode of the physical connection may be a data communication mode in which transmitter and receiver ports of the external device are connected to transmitter and receiver ports of the electronic device, and a second mode of the physical connection may be a power transmission mode in which a charging port of the external device is connected to a battery port of the electronic device. The integrated switching regulators may be configured to switch between the first and second modes at one-second intervals. In this example embodiment, if a voltage received from the charging port of the external device is detected at the overvoltage protection switch, this may trigger the reset function of the integrated switching regulator of the electronic device, thereby disconnecting the transmitter and receiver ports of the electronic device from the interface and separating the electronic device from the damaging voltage.

In one implementation of the example embodiment, the data communication mode may be a universal asynchronous receiver-transmitter (UART) mode and the power transmission mode may be a power line communication (PLC) mode. The UART mode may support data throughput at a rate of about 4 Mbps but without carrying voltage for powering or recharging the electronic device. The PLC mode may support data communication at a lower throughput rate, such as 100 Kbps or lower, but may carry voltage sufficient to power or recharge the electronic device, such as a voltage of about 3.8 volts or higher. The UART transmitter and receiver lines may be capable of handling up to 2.5 volts, but not more, and a voltage of 3.8 volts may cause damage to the transmitter and receiver lines within a timeframe on the order of milliseconds. By compassion, the overvoltage protection switch may activate the reset function and disconnect the transmitter and receiver ports of the electronic device from the interface in less than a microsecond. In other words, even if an overvoltage briefly occurs at the UART ports, there is not enough time for the overvoltage to cause any damage.

The power clamping solution can be integrated into the electronic device design in little time, such as within one month, at a low cost, and without taking up significant additional space.

Example Systems

Figure 1:
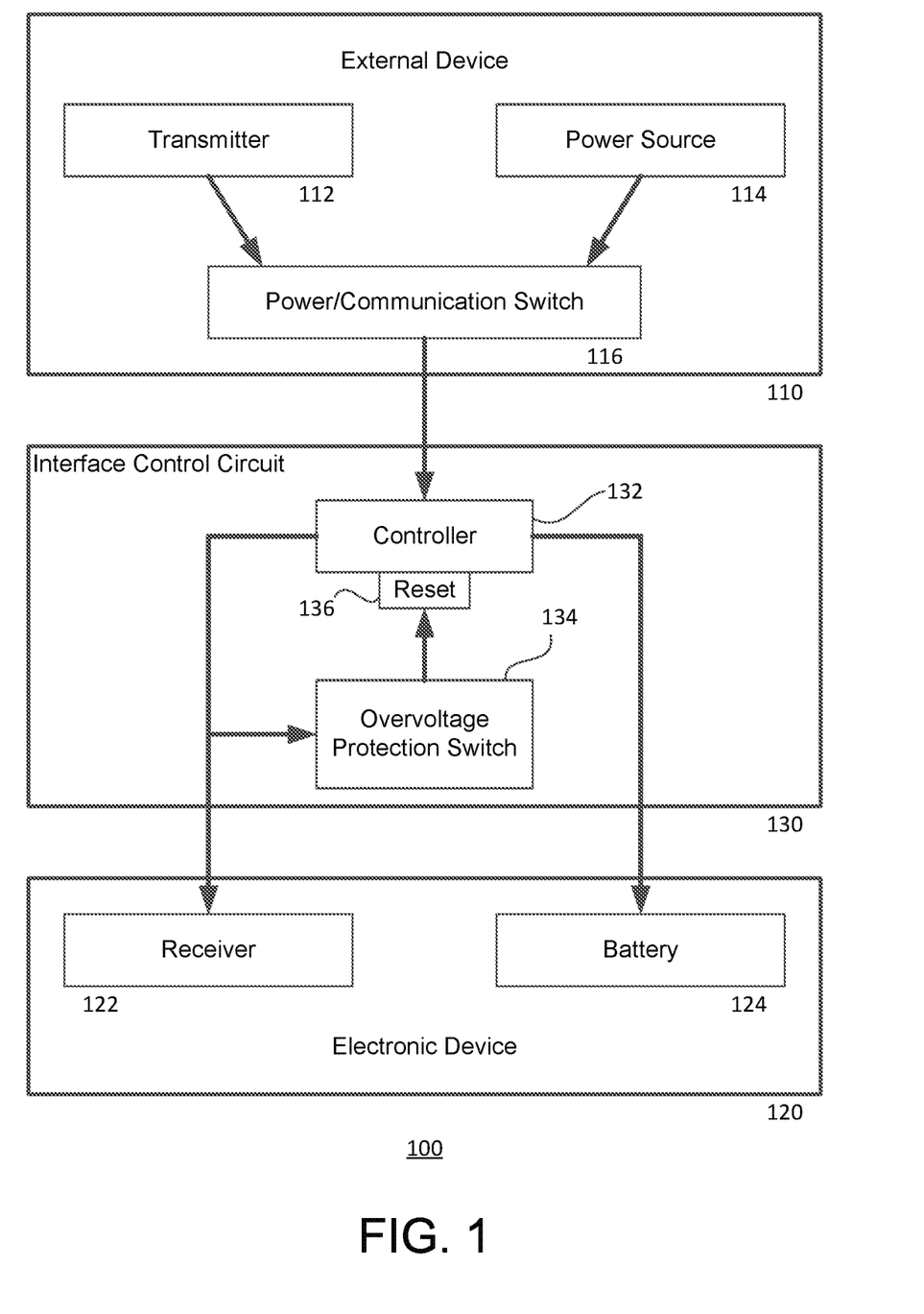
FIG. 1 is a block diagram of an example system in accordance with an aspect of the present disclosure.

FIG. 1 is a block diagram illustrating an example system 100 including an external device 110 that is capable of being interfaced with an electronic device 120. Interfacing the external device 110 and the electronic device 120 may be performed using an interface control circuit 130. The interface control circuit may be capable of controlling a mode of interfacing between each of the external device 110 and the electronic device 120. A first example mode of communication may be a data communications mode, in which data signals are transferred from a transmitter 112 of the external device 110 to a receiver 122 of the electronic device 120. Examples of data signals may include data communications for electronic device firmware updates or factory debug signaling. A second example mode of interfacing may be a power transfer mode in which electrical power is transferred from a power source 114 of the external device 110 to a rechargeable battery 124 of the electronic device 120.

In the example of FIG. 1, the external device 110 includes a switch 116 for controlling which one of the transmitter 112 or the power source 114 is connected to the interface control circuit 130 at a given time. The switch 116 may be controlled by either one or both of instruction signals from the external device 110 itself or instruction signals from the interface control circuit 130.

The interface control circuit 130 includes a controller 132 for controlling routing of communication signals and power to the receiver 122 and battery 124 of the electronic device, respectively. In some examples, the controller 132 may be an integrated circuit (IC) such as a power management integrated circuit (PMIC) capable of power conversion and voltage scaling, battery charging, and other functions. Additionally or alternatively, the controller may be integrated into other hardware of the external device, such as a module within a system-on-a-chip (SOC).

The interface control circuit 130 further includes an overvoltage protection switch 134 positioned in parallel to an electrical path connected between the transmitter 112 of the external device and the receiver 122 of the electronic device 120. The overvoltage protection switch 134 may be capable of sensing an overvoltage condition along the electrical path, and trigger the controller 132 to initiate a reset in response to the overvoltage condition. Communication between the overvoltage protection switch 134 and the controller 132 may be facilitated through a reset line connected at one end to the overvoltage protection switch 134 and at the other end to a reset terminal of the controller 132.

In operation, components at or connected to the receiver 122 of the electronic device may be capable of receiving up to a first voltage level. The first voltage level may be less than a voltage level of the data communication signals within the system 100. However, the first voltage level may be less than a second voltage level at which power is delivered from the power source 114 to the battery 124 in the power transmission mode. In such a case, the overvoltage protection switch 134 may be configured to initiate the reset at the controller 132 when a voltage along the electrical path exceeds the first voltage level, such as when power charging signals are inadvertently transmitted over the electrical path towards the receiver 122 of the electronic device 120. Activating the reset at the controller may cause the receiver 122 of the electronic device to be set to a high impedance mode. The high impedance mode may prevent the flow of electrical current above the first voltage level along the electrical path to the receiver 122. In one example implementation, the high impedance mode may involve opening one or more power charging switches at the interface control circuit 130 to cut off the flow of electrical current from the charger 114 of the external device 110 along the electrical path.

Figure 2:
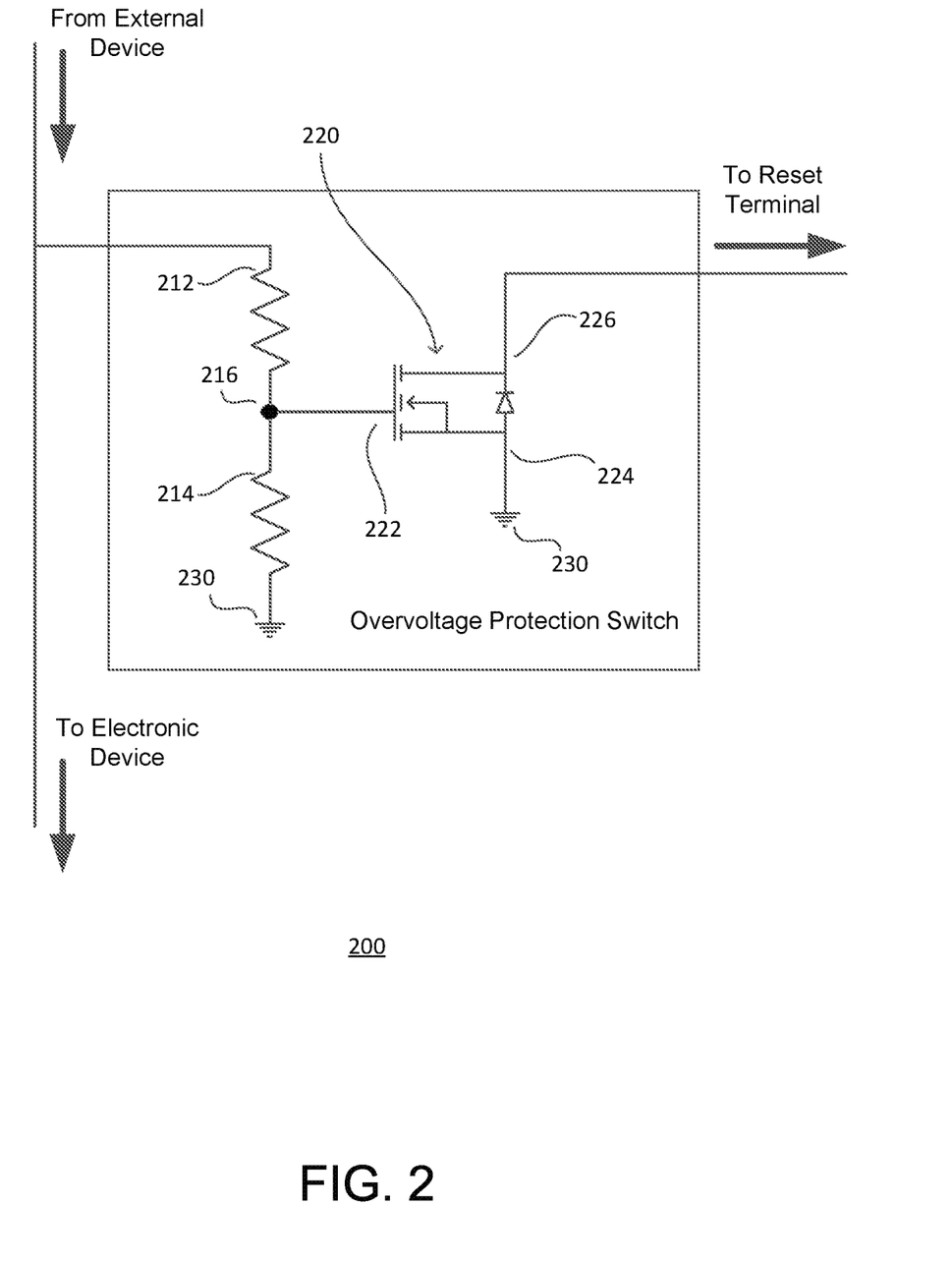
FIG. 2 is a block diagram of an example overvoltage protection switch of the system of FIG. 1.

An example overvoltage protection switch 200 is shown in FIG. 2. The switch 200 includes a first resistor 212 and a second resistor 214 serially connected to one another and in parallel to an electrical path between the external device and the electronic device. The switch 200 also includes a transistor 220. In the example of FIG. 2, the transistor 220 includes a gate 222 connected to a node 216 between the first resistor 212 and the second resistor 214, a drain 224 connected to ground 230, and a source 226 connected to the reset terminal of the controller.

In operation, the resistors 212, 214 may function as a voltage divider, whereby a voltage received from the external device may be reduced according to the resistance values of the resistors 212, 214 by a predetermined factor. The transistor 220 may be an enhancement mode transistor that is biased off when voltage applied at the gate at below a predetermined threshold. When the reduced voltage at the node 216 is at or above the predetermined threshold, the resulting gate voltage may result in a turn-on threshold voltage across the gate-source path for the transistor to begin to conduct, at which point the drain current increases and activates the reset terminal of the controller via the reset line.

The values of the resistors 212, 214 may be selected based on a combination of the turn-on gate-source voltage of the transistor 220 and a voltage tolerance of the receiver of the electronic device. For example, if the receiver is capable of handling a voltage of up to 2.5V and the transistor 220 has a turn-on gate-source voltage of about 0.7V, then the resistors may be chosen such than a 2.5V input is reduced to a value just above 0.7V, such as by the first resistor 212 having a resistance value about twice as much as the second resistor 214.

The overall size of the overvoltage protection switch 200, including the two resistors 212, 214 and the transistor 220, may be as small as about 0.4 mm$^2$. This accounts for each resistor occupying about 0.4×0.2 mm of space and the transistor occupying about 0.6×0.4 mm of space. In other examples, the overall size of the overvoltage protection switch 200 may be larger, such as 1 mm$^2$, or in some cases even more space. Ultimately, the footprint of the overvoltage protection switch 200 is relatively small compared to alternative solutions such as providing an additional buffer IC to protect the electronic device.

In the example system 100 of FIG. 1, a single circuit is shown as being provided between the external device 110 and the electronic device 120 in order to interface the two devices with one another. However, it should be understood that the interface control circuit 130 shown in FIG. 1 may actually include multiple circuits, such as an external device-side IC and an electronic device-side IC. Providing multiple circuits between the external device and the electronic device may be advantageous for facilitating bidirectional communication between the two devices. Additionally, the multiple circuits may be used to provide a respective single port on each of the external device-side and the electronic device-side that can be connected to one another to facilitate both data communication and power transfer.

Figure 3:
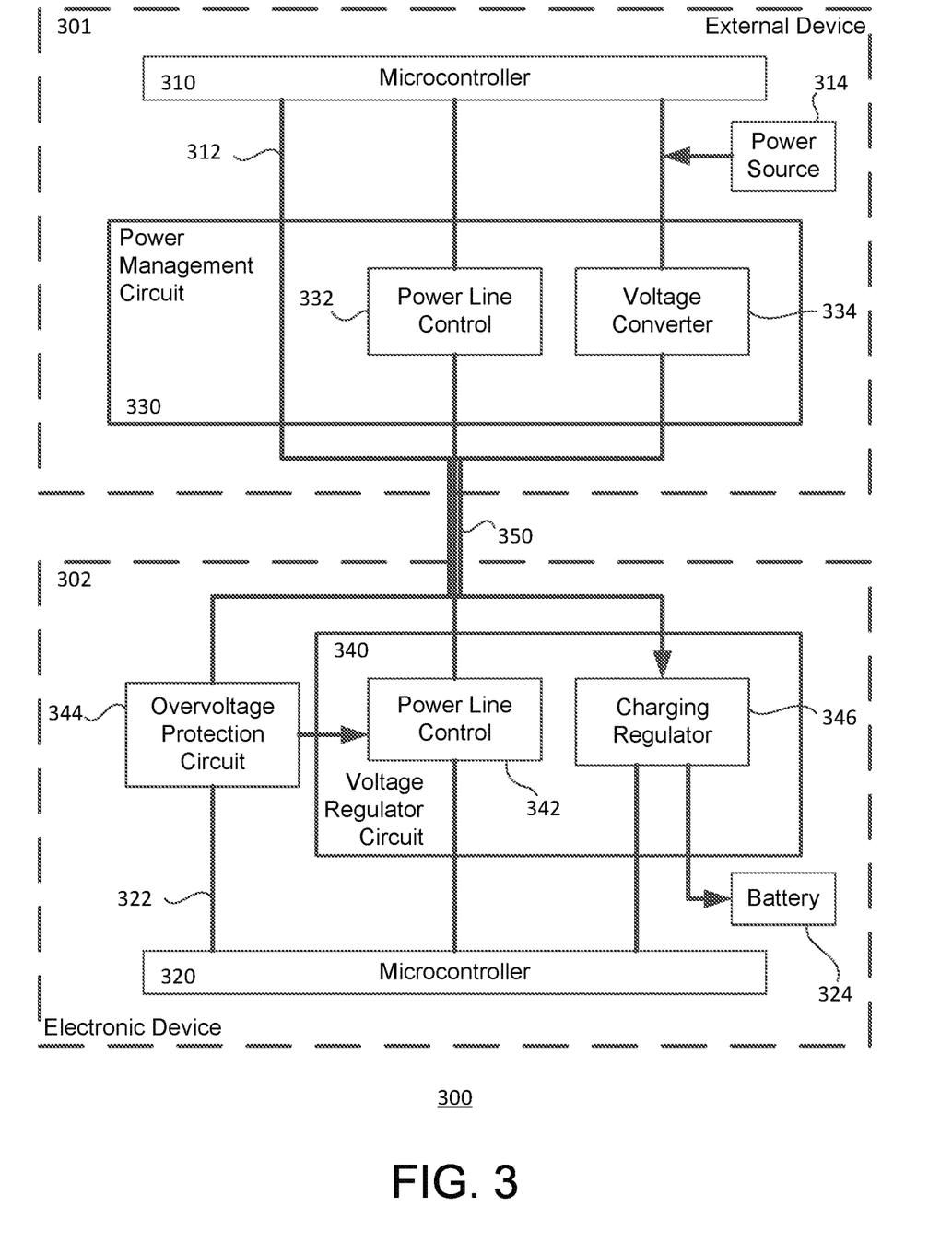
FIG. 3 is a block diagram of another example system in accordance with an aspect of the present disclosure.

The example implementation of FIG. 3 illustrates a system 300 that includes a an external device 301 and an electronic device 302 that interface with one another to facilitate data communication and power transmission. Each of the external device 301 and the electronic device 302 includes a respective microcontroller circuit 310, 320 having one or more respective communication lines 312, 322 for facilitating data communications between one another. The communication lines may connect to each of a transmit (Tx) port and a receive (Rx) port at each of the devices 301, 302. The external device 301 also includes a power source 314 capable of charging a battery 324 located at the electronic device 302.

The external device 301 may be connected to a power management circuit 330, such as a PMIC, for managing power transmission from the power source 314. The power management circuit 330 may be integrated with a housing of the external device 301. A voltage converter 334 is included in the power management circuit 330 for controlling a voltage level of the power supplied by the power source 314. The voltage level output by the voltage converter 334 may depend on the particular electronic device that connects to the external device 301.

The electronic device 302 may include a voltage regulator circuit 340 for managing the electrical signals received from power management circuit 330. The voltage regulator circuit 340 may be integrated with a housing of the electronic device 302. The voltage regulator circuit 340 includes a charging regulator 346 positioned along an electrical path connecting the power management circuit 330 to the battery 324. The charging regulator 346 may be a linear regulator or low-dropout regulator integrated within a battery charger. The electronic device further includes an overvoltage protection circuit 344 positioned along an electrical path connecting the communication lines 312 of the microcontroller 310 included in the external device 301 to the communication lines 322 of the microcontroller 320 included in the electronic device 302 through the power management circuit 330. The overvoltage protection circuit 344 may be comparable to the overvoltage protection switch described in connection with each of FIGS. 1 and 2.

Additionally, each of the external device 301 and the electronic device 302 may include a single external port over which both data communications between the communication lines 312, 322 of the microcontrollers 310, 320 and power transmission between the power source 314 and battery 324 are carried. For example, as shown in FIG. 3, a single physical connection 350 is provided between the external device 301 and the electronic device 302. The single physical connection 350 connects the power management circuit 330 at the external device 301 to the voltage regulator circuit 340 at the electronic device 302. On the external device 301 side, both a power line from the power source 314 and the communication lines 312 for data communications from the microcontroller 310 may connect to the single physical connection 350 through the power management circuit 330. Similarly, on the electronic device 302 side, both a power line connected to the battery 324 and communication lines 322 for data communications with the microcontroller 320 may connect to the single physical connection 350 through the voltage regulator circuit 340.

Each of the power management circuit 330 and the voltage regulator circuit 340 may include a respective power line control circuit 332, 342. The power line control circuit 350 may be a power line communication (PLC) engine for controlling charging and communication over the single physical connection 350. Each power line control circuit 332, 342 may be connected to and controlled by the microcontroller 310, 320 of its respective device. The power line control circuit 342 at the voltage regulator circuit 340 may include the reset terminal and reset function to open the power line switches and cut off power supplied from the power source from reaching the communication lines 322 of the electronic device. Opening the power line switches may involve setting the ports of the electronic device microcontroller 320 to which the communication lines 322 are connected to a high impedance mode so that high voltage at the communication lines is effectively cut off from the microcontroller 320.

In the above examples, it should be recognized that the overvoltage protection circuitry is located downstream of the control circuitry for cutting off the flow of electrical current. Although this means that at least some high voltage may reach the electronic device in the event of power from the power source being inadvertently sent to the communication lines of the electronic device, the high voltage cutoff may occur within time to prevent any damage from occurring. For instance, the voltage level supplied to the battery may be only slightly higher, such as less than twice as high, than the voltage level used for data communications. In such a case, the amount of time needed for the electronic device to suffer damage due to high voltage may be in the order of milliseconds. However, the response time of the overvoltage protection circuitry to activate the reset function of the controller and disconnect the high voltage may be much shorter. For instance, the overvoltage reaction time may be on an order of less than one millisecond, on the order of microseconds, or even on the order of less than one microsecond.

The above examples generally describe the data communication mode as being exclusively for data communication and the power transmission mode as being exclusively for power transmission. However, some example implementations may utilize different modes that perform both data communication and power transmission but at different voltage levels, different data throughputs, or both. For instance, in one example implementation, the data communication mode may support a relatively high data throughput, whereas the power transmission mode may supply a higher voltage but support data communication at a relatively lower data throughput. In one such implementation, the data communication mode may be a universal asynchronous receiver-transmitter (UART) mode, and the power transmission mode may be a power line communication (PLC) mode. Both of the UART mode and the PLC mode may support data communication but at different throughputs to different terminals of the microcontroller at the electronic device. For example, the UART mode may support data transfers between UART transmitter and receiver terminals at the microcontrollers of each of the external device and the electronic device at a rate of 4 Mbps, whereas the PLC mode may carry a direct current (DC) voltage, such as 3.7V or more, and may further support data communication between the external device 310 and another terminal of the microcontroller of the electronic device at a rate of 100 Kbps or lower.

The above examples generally refer to an electronic device and an external device capable of powering and communicating with the electronic device. In some examples, the electronic device may be a rechargeable device, and the external device may be a charger for the rechargeable device, whereby the power-receiving portions of the electronic device may include a rechargeable battery of the electronic device. For instance, the rechargeable device may be a smartphone, smartwatch, headphones, or earbud, whereby the interface control switch may be an integrated circuit that is housed within a housing of the device.

Example Methods

An example routine 400 performed by the interface control circuit of the system is described in greater detail in connection with the diagram of FIG. 4. It should be understood that the routine is merely an example, and in other examples, certain steps may be added, subtracted, replaced or reordered.

At block 410, a signal is received by the interface control circuit from an external device. The signal may be received at an overvoltage protection circuit including a voltage divider having two or more resistors. The signal may have a given voltage depending on an output voltage from the external device.

At block 420, the overvoltage protection circuit operates differently depending on whether the given voltage of the signal is greater than or not greater than a predetermined threshold. If the voltage is not above the predetermined threshold, then at block 430, a reset function of the interface control circuit is not activated and the signal is free to pass to the communication lines of the electronic device. Since the voltage is not above the predetermined threshold, this may indicate that the signal is a data communications signal that is being transmitted towards the one or more communication lines of the electronic device. In one example implementation, the voltage not meeting an overvoltage condition, including but not limited to the voltage not being above the predetermined threshold, may result in a transistor at the overvoltage protection circuit remaining in its unbiased conduction state, which in turn may avoid activation of the reset function.

Alternatively, if the voltage is above the predetermined threshold, then at block 440, a reset function at the interface control circuit may be activated and, at block 450, one or more power line switches of the interface control circuit are opened in order to cut off the signal from continuing to reach the one or more communication lines of the electronic device. Since the voltage is above the predetermined threshold, this may indicate that the signal is a power transmission signal that is being transmitted towards a battery of the electronic device, and not towards the one or more communication lines. Hence, cutting off the high voltage signal from the communication lines may protect the device from being damaged. Continuing with the example implementation referenced in connection to block 430, the voltage meeting the overvoltage condition, including but not limited to the voltage being above the predetermined threshold, may result in the transistor at the overvoltage protection circuit being biased to a new conduction state, which in turn may cause activation of the reset function. For instance, the voltage may turn on or turn off the transistor, causing the voltage at the reset terminal to activate.

Figure 4:
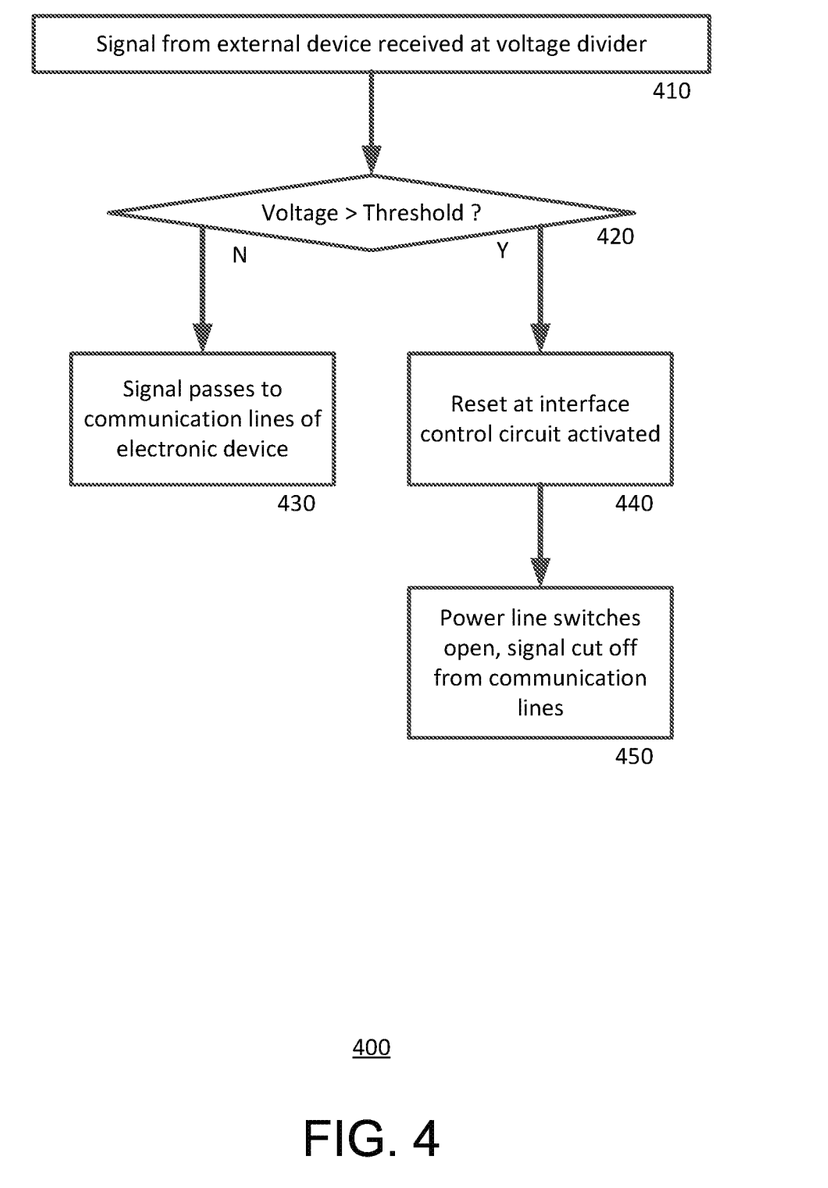
FIGS. 4 and 5 are flow diagrams of example routines in accordance with aspects of the present disclosure.
Figure 5:
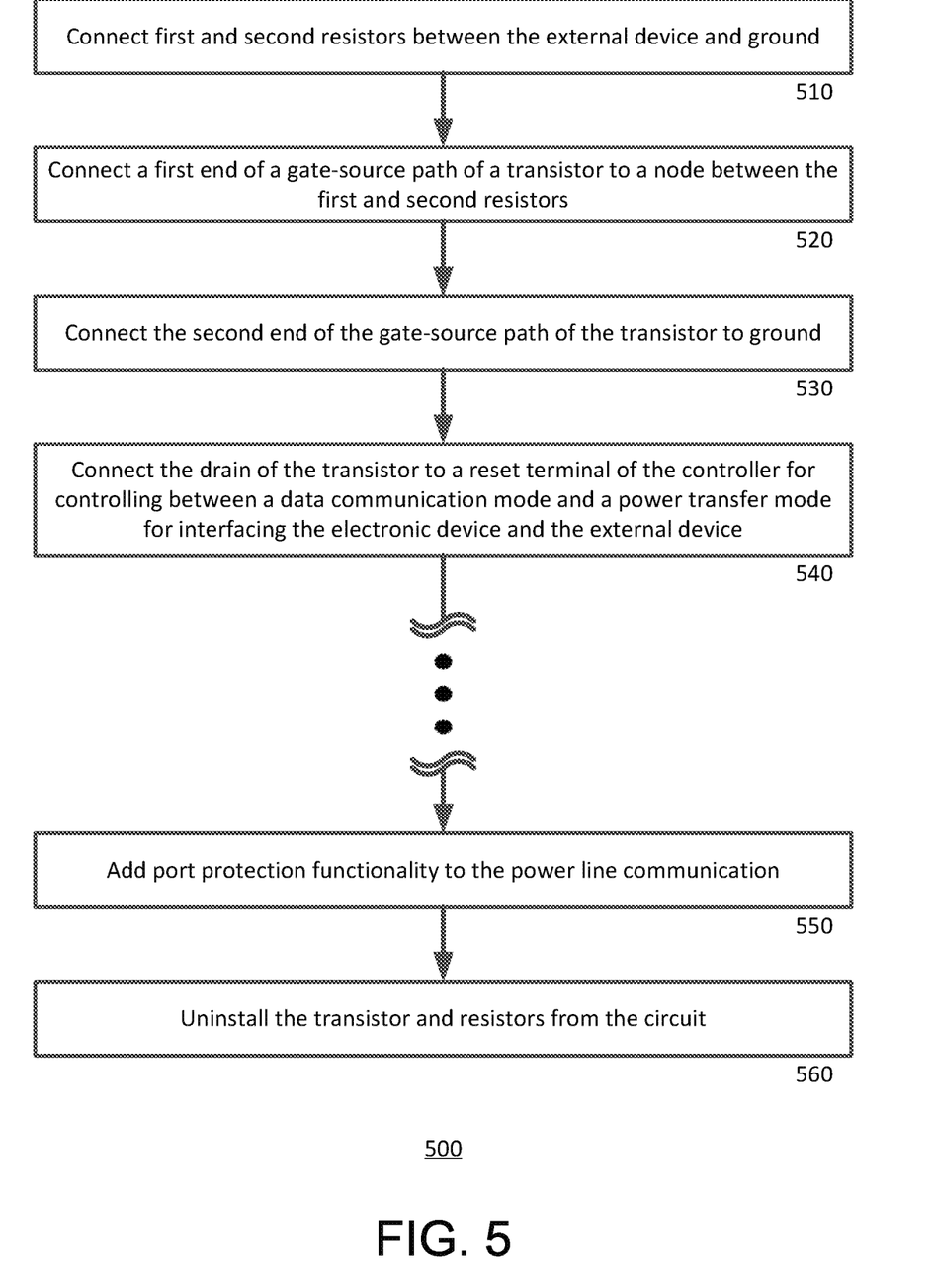

The port protection routine 400 of FIG. 4 may be implemented on an electronic device having an integrated circuit for power and communications management. FIG. 5 is a flow diagram of an example routine 500 for constructing a circuit for performing the port protection routine 400.

At block 510, first and second resistors are connected along an electrical path between the external device and ground. The electrical path may be a path in parallel to the electrical path between the external device and one or more communication lines of the electronic device. Providing the parallel voltage dividing path may effectively constitute connecting a voltage sensor to the electrical path between the external device and the communication lines of the electronic device.

At block 520, a first end of a gate-source path of a transistor is connected to a node between the first and second resistors. Additionally, at block 530, the second end of the gate-source path of the transistor is connected to ground. In effect, the gate of the transistor may be tied to the voltage sensor, such that a sensed voltage of the circuit may or may not activate the transistor depending on the sensed voltage.

At block 540, the drain of the transistor is connected to a reset terminal of the controller for controller for controlling interfacing the electronic device and the external device. Controlling interfacing may involve controlling between a data communication mode and a power transfer mode, whereby the reset terminal may be used to open power line switches in the event that power transmission level voltage is sensed at a communication line of the electronic device.

The process of designing and installing the components described at blocks 510-540 may take about one month to perform, which is much less than the time to internally integrate port protection into the integrated circuit for power and communications management. Typically, the design and fabrication steps needed to integrate port protection in the integrated circuit may take around one year.

Optionally, if it is eventually decided that the components installed in the routine 500 of FIG. 5 should be replaced with an integrated port protection solution, this may be easily performed. At block 550, port protection functionality is added directly to the power line communication engine of the integrated circuit. Additionally, at block 560, all or some of the transistor and voltage dividing resistors may be uninstalled from the circuit, thereby reducing the overall footprint of the device and the overall cost of production once the integrated solution is tested and made available.

The systems and routines described herein provide a low-cost, small, and easy-to-implement solution for protecting communication circuitry from overvoltage due to misdirected power line voltage. The solution is additionally removable when alternative solutions are available, thereby facilitating for reduced production costs both when a less expensive solution is not available and also when a solution with an even smaller footprint is later available. Thus, the solution described herein can reduce production costs, production time, and production complexity without permanently committing future production to the proposed design.

Figure 6:
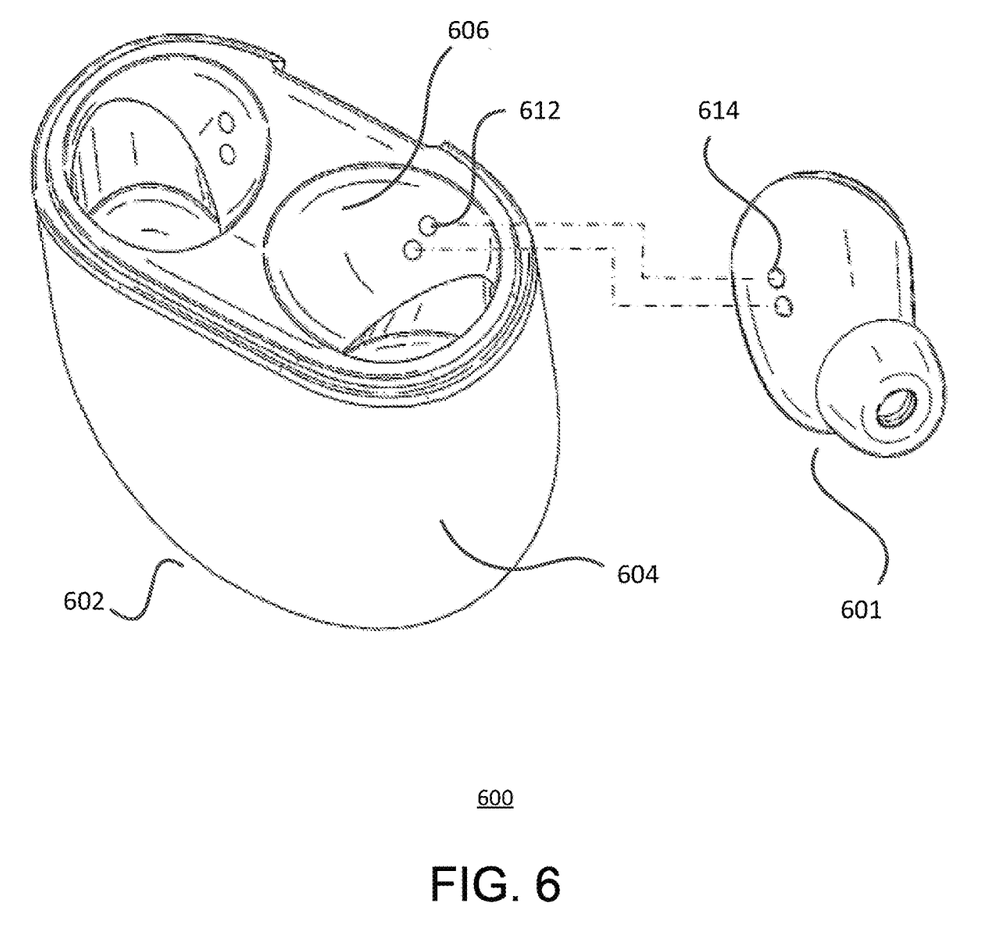
FIG. 6 is a perspective view of an example electronic device and external device in accordance with an aspect of the present disclosure.
Figure 7:
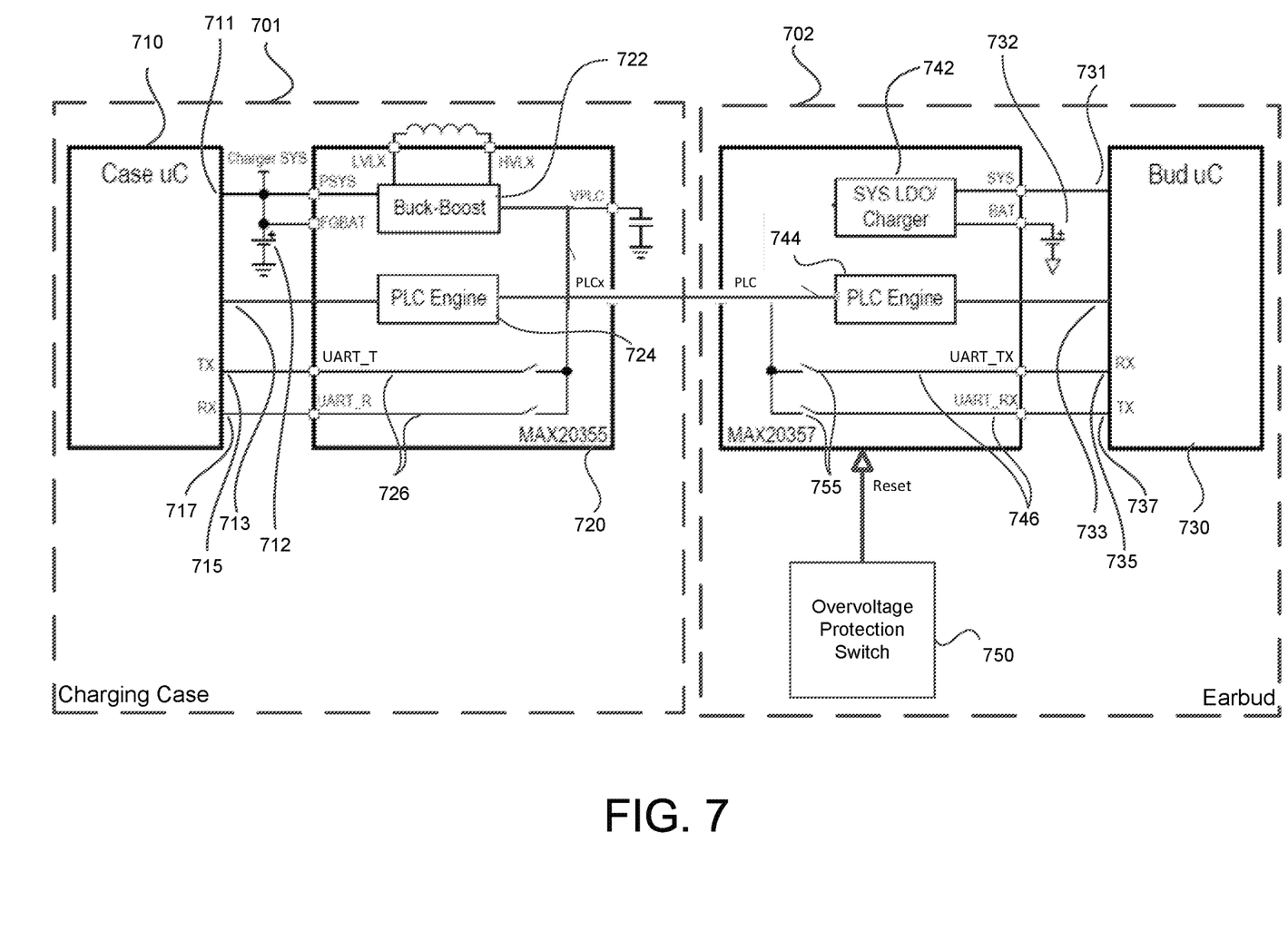
FIG. 7 is a circuit diagram of an example circuit arrangement for the electronic device and external device of FIG. 6.

One example application of the systems and routines described herein is shown in FIGS. 6 and 7. FIG. 6 is a perspective view of a portable speaker system 600 including one or more earbuds 601 and a charging case 602 for storing and charging the one or more earbuds 601. The charging case 602 may include a housing 604 containing one or more cavities 606 into which the corresponding one or more earbuds 601 may be inserted. An inner surface of each cavity 606 may include a single power and communication port 612 that, when the corresponding earbud 601 is inserted into the cavity 606, contacts a corresponding single power and communication port 614 of the earbud 601. As shown in FIG. 6, corresponding ground ports also may be provided in each of the charging case 602 and earbud 601.

FIG. 7 is a circuit diagram of an example circuit arrangement for the portable speaker system 600 of FIG. 6. As shown in FIG. 7, each of the charging case 701 and earbud 702 includes its own respective microcontroller (uC) The charging case 701 includes a MAX20355 power management circuit 720 containing a buck-boost regulator 722, PLC Engine 724 and UART communication lines 726. The case uC 710 includes separate terminals 711, 713, 715, 717 for connecting to each of the power source 712 and charging regulator, the PLC engine and the UART communication lines, respectively. The earbud 702 includes a MAX20357 voltage regulator circuit 740 containing a PLC engine 744, UART communication lines 746, and a low dropout (LDO) regulator 742 for controlling charging at a battery 732. The bud uC 730 includes separate terminals 731, 733, 735, 737 for connecting to each of the regulator, the PLC engine and the UART communication lines, respectively. The earbud 702 also includes an overvoltage protection switch 750 to sense an overvoltage condition along the UART communication lines and to trigger a reset at the voltage regulator circuit 740 in the case of the overvoltage condition. The reset function can cause the switches 755 along the UART communication lines of the earbud to open, thereby preventing excess power from reaching and damaging the bud uC 730 circuitry.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A circuit for controlling an interface between an integrated circuit of an electronic device and an external device, the circuit comprising:
    (a) an interface control switch including a controller for controlling a mode of the interface between each of:
        a first mode that connects the external device to the integrated circuit of the electronic device via one or more receiver lines of the electronic device; and
        a second mode that connects the external device to a battery of the electronic device,
        wherein the controller includes a reset line for resetting the interface control switch; and
    (b) an overvoltage protection switch connected between the one or more receiver lines of the electronic device and the reset line of the controller, the overvoltage protection switch configured to activate the reset line of the controller in response to an overvoltage condition at the one or more receiver lines of the electronic device.

2. The circuit of claim 1, wherein the one or more receiver lines of the electronic device are configured to support receiving up to a first voltage level, and wherein the second mode is configured to deliver a voltage to the battery of the electronic device at a second voltage level greater than the first voltage level.

3. The circuit of claim 2, wherein the second voltage level is less than twice the first voltage level.

4. The circuit of claim 2, wherein the first voltage level is about 2.5 volts, and wherein the second voltage level is about 3.7 volts.

5. The circuit of claim 2, wherein the first mode is a universal asynchronous receiver-transmitter (UART) mode, and wherein the second mode is a power line communication (PLC) mode.

6. The circuit of claim 5, wherein the UART mode is configured to support data communication over the interface at a first throughput, and wherein the PLC is configured to support data communication over the interface at a second throughput lower than the first throughput.

7. The circuit of claim 6, wherein the first throughput is 4 Mbps, and wherein the second throughput is 100 Kbps or lower.

8. The circuit of claim 1, wherein the overvoltage protection switch comprises a transistor having a drain connected to the reset line and a gate-source path and resistor divider positioned between the one or more receiver lines of the electronic device and ground, wherein the gate is configured to activate the reset line in response to the voltage across the gate-source path reaching a gate threshold.

9. The circuit of claim 8, wherein the overvoltage condition is a voltage greater than or equal to a predetermined threshold voltage, the gate threshold is less than the predetermined threshold voltage, and wherein the overvoltage protection switch further comprises a voltage divider arranged to provide a voltage at the gate threshold across the gate-source path when the voltage at the one or more receiver lines of the electronic device is equal to the predetermined threshold.

10. The circuit of claim 9, wherein the predetermined threshold is about 2.5 volts, and wherein the gate threshold is about 0.7 volts.

11. The circuit of claim 9, wherein a footprint of the overvoltage protection switch is between 0.4 mm$^2$ and 1 mm$^2$.

12. The circuit of claim 1, wherein the reset line for resetting the interface control switch is configured to, when activated, set the integrated circuit of the electronic device to a high impedance mode.

13. The circuit of claim 12, wherein the interface control switch is configured to, when the reset line is activated, set the integrated circuit to the high impedance mode in less than one microsecond.

14. The circuit of claim 1, wherein the interface between the electronic device and the external device is a single physical connection configured to support both the first mode and the second mode.

15. The circuit of claim 1, wherein the interface control switch is an integrated switching regulator.

16. The circuit of claim 1, wherein the battery of the electronic device is rechargeable, and wherein the external device is a charger.

17. The circuit of claim 16, wherein the electronic device is a smartphone, smartwatch, headphone, or earbud, and wherein the integrated circuit is integrated into a housing of the electronic device.

18. A method for controlling an interface between an integrated circuit of an electronic device and an external device, the method comprising:
controlling, by an interface control switch, a mode of the interface between each of:
a first mode that connects the external device to the integrated circuit of the electronic device via one or more receiver lines of the electronic device; and
a second mode that connects the external device to a battery of the electronic device;
receiving, by the interface control switch, a reset signal from a reset line connecting the interface control switch to an overvoltage protection switch connected between the one or more receiver lines of the electronic device and the reset line of the controller; and
activating, by the interface control switch, a high impedance mode at the integrated circuit of the electronic device in response to the reset signal, wherein the high impedance mode avoids power from the external line reaching the integrated circuit via the one or more receiver lines of the electronic device.

19. The method of claim 18, wherein the overvoltage protection switch comprises a transistor having a drain connected to the reset line and a gate-source path and resistor divider positioned between the one or more receiver lines of the electronic device and ground, wherein the reset signal is received in response to the voltage across the gate-source path reaching a gate threshold.

20. The method of claim 18, wherein the first mode is a universal asynchronous receiver-transmitter (UART) mode configured to support data communication over the interface at a first throughput, wherein the second mode is a power line communication (PLC) mode configured to support data communication over the interface at a second throughput lower than the first throughput, and wherein controlling the mode of the interface comprises switching between the UART mode and the PLC mode.

* * * * *